United States Patent [19]

Sugio et al.

[11] 4,189,565

[45] Feb. 19, 1980

[54] PROCESS FOR POLYMERIZING TRIOXANE

[75] Inventors: Akitoshi Sugio, Omiya; Akira Amemiya; Tetsuya Abe, both of Tokyo; Tomotaka Furusawa, Matsudo; Takeo Suzumori, Tokyo; Mutsuhiko Takeda, Matsudo; Masaharu Kimura, Tokyo; Yoshiharu Ohtsuki, Urawa; Katsumasa Tanaka; Toshikazu Umemura, both of Tokyo; Kiyokazu Kawaguchi, Yokkaichi; Michio Ohba, Tokyo, all of Japan

[73] Assignee: Mitsubishi Gas Chemical Company, Inc., Tokyo, Japan

[21] Appl. No.: 971,565

[22] Filed: Dec. 20, 1978

[30] Foreign Application Priority Data

Dec. 24, 1977 [JP] Japan .................. 52-156212

[51] Int. Cl.² .................... C08G 2/10; C07D 317/0
[52] U.S. Cl. ...................... 528/232; 260/340; 528/241; 528/242; 528/270
[58] Field of Search .............. 260/340; 528/232, 241, 528/242, 270

[56] References Cited

U.S. PATENT DOCUMENTS

| | | | |
|---|---|---|---|
| 3,426,040 | 2/1969 | Langecker | 260/340 |
| 3,470,208 | 9/1969 | Lasco et al. | 260/340 |
| 3,483,214 | 12/1969 | Sperber et al. | 260/340 |
| 3,637,751 | 1/1972 | Fuchs et al. | 260/340 |
| 4,110,298 | 8/1978 | Wells et al. | 260/340 |
| 4,125,540 | 11/1978 | Sugio et al. | 260/340 |

*Primary Examiner*—Lucille M. Phynes
*Attorney, Agent, or Firm*—Frishauf, Holtz, Goodman & Woodward

[57] ABSTRACT

A process for polymerizing trioxane made from an aqueous solution of methanol-containing formaldehyde by a conventional method or copolymerizing the trioxane with another monomer, characterized by cooling the trioxane to crystallize it, allowing the trioxane in a crystalline state to stand in an open system in an atmosphere of air or an inert gas to remove polyoxymethylene dimethoxide from the trioxane, melting the trioxane, and polymerizing the trioxane or copolymerizing the trioxane and the another monomer.

10 Claims, No Drawings

PROCESS FOR POLYMERIZING TRIOXANE

BACKGROUND OF THE INVENTION

This invention relates to a process for polymerizing trioxane, and particularly relates to a process for polymerizing crude trioxane made from an aqueous solution of methanol-containing formaldehyde by a conventional method or copolymerizing the trioxane with another monomer, characterized cooling the trioxane to crystallize it, allowing the trioxane in a crystalline state to stand in an open system in an atmosphere of air or an inert gas to remove polyoxymethylene dimethoxide from the trioxane, melting the trioxane, and polymerizing the trioxane or copolymerizing the trioxane and another monomer.

In general, trioxane has been prepared by heating an aqueous solution of formaldehyde in the presence of an acid catalyst. Trioxane has been industrially prepared according to the steps of heating a 30–70% aqueous solution of formaldehyde in the presence of an acid catalyst to obtain a distillate containing 20–55% by weight of trioxane, 17–35% by weight of formaldehyde and 20–50% by weight of water, and extracting the distillate with a solvent which is insoluble or only slightly soluble in water to obtain trioxane from the distillate.

Furthermore, examples of processes for purifying the crude trioxane include a process for distilling the crude trioxane in the presence of an anionic ion exchange resin or a basic amine; a process for purifying the crude trioxane using activated alumina or molecular sieves; a process for extracting the tioxane with a solvent and removing the solvent from the distillate by washing, followed by distilling trioxane in the presence of an amine; and a process for removing impurities from the crude trioxane through chemical reaction. However, though in these processes for purification of trioxane, formic acid, water and formaldehyde are removed from the crude trioxane, polyoxymethylene dimethoxide formed as a by-product during preparation of trioxane is not be removed.

Polyoxymethylene dimethoxide is represented by the following formula $$CH_3O(CH_2O)_nCH_3 \ldots \quad (1)$$

wherein n is integer of 2–7. Polyoxymethylene dimethoxide is always formed as a by-produce when an aqueous solution of methanol-containing formaldehyde is heated in the presence of an acid catalyst to form trioxane.

Particularly, much polyoxymethylene dimethoxide having the formula $$CH_3O(CH_2O)_nCH_3 \ldots \quad (1)$$

wherein n is 2 or 3 is formed in this case. The polyoxymethylene dimethoxide acts as a chain transfer agent in case of polymerizing trioxane or copolymerizing trioxane and another monomer, thereby lowering the molecular weight of the resulting polymer or copolymer. Therefore, before trioxane alone is polymerized or trioxane is copolymerized with another monomer, it is necessary to remove polyoxymethylene dimethoxide from the trioxane before polymerization. In general, it is preferable that the concentration of the polyoxymethylene dimethoxide be reduced to less than 500 ppm, more preferably 200 ppm. However, the boiling point of polyoxymethylene dimethoxide having the formula $$CH_3O(CH_2O)_nCH_3$$

wherein n is 2 or 3 is near to that trioxane. In addition, the two compounds are similar to each other in chemical properties. So, the two compounds can not be separated by distillation, adsorption, extraction or reaction with another compound. Therefore, when trioxane is polymerized or copolymerized by the prior art process, lowering of the molecular weight of the resulting polymer or copolymer cannot be avoided.

When an aqueous solution of formaldehyde having lower methanol content, such as paraformaldehyde or alpha-polyoxymethylene having formaldehyde content of more than 85% and methanol content of less than 1% is heated, trioxane having lower polyoxymethylene dimethoxide content can be obtained. But such paraformaldehyde and alpha-polyoxymethylene are costly. To use these raw materials industrially is not efficient. In general, an aqueous solution having 30–40% by weight of formaldehyde and 1–8% by weight of methanol has been used as a raw material for preparing trioxane. So, formation of polyoxymethylene dimethoxide as a by-product is unavoidable. In the above mentioned formula (1), the compound wherein n is 1 is methylal. Though methylal acts as a chain transfer agent in case of polymerizing trioxane, it can be easily removed through distillation.

SUMMARY OF THE INVENTION

The present inventors have carried out research to find a process for effectively removing polyoxymethylene dimethoxide from trioxane. As a result, we found that polyoxymethylene dimethoxide can be easily removed from trioxane by allowing a mixture of trioxane and polyoxymethylene dimethoxide in a crystalline state to stand in an open system in an atmosphere of air or an inert gas. According to the present invention, polyoxymethylene dimethoxide can be removed from trioxane without need for complicated purification. In addition, according to the present invention, the use of expensive aqueous solution of formaldehyde having low methanol content becomes unnecessary.

DETAILED DESCRIPTION OF THE INVENTION

A process for producing crude trioxane employed in this invention is explained in the following. Crude trioxane is produced from an aqueous solution of methanol-containing formaldehyde by a conventional method. Though a variety of processes are known for producing trioxane from said aqueous solution, the processes disclosed in Japanese Patent Publication Nos. 28197/1974 and 28518/1974 filed by the assignee of this invention are preferred, because the apparatus used in the processes disclosed in these publications is simple. In other words, the preferred process comprises the steps of heating an aqueous solution of methanol-containing formaldehyde to obtain distilled vapor, introducing the distilled vapor into a vapor-liquid contacting apparatus to contact the distilled vapor with a solvent which is insoluble or is only slightly soluble in water, thereby removing low boiling material, such as methylal and methyl formate as by-products together with a portion of the solvent from the resulting trioxane, and recovering a solution of trioxane in the solvent from the bottom of the apparatus. The solvent is removed from the solution through distillation.

The liquid crude trioxane so formed generally contains 1000-15000 ppm of polyoxymethylene dimethoxide formed as a by-product during the preparation of the trioxane. Such liquid trioxane containing a small amount of polyoxymethylene dimethoxide is crystallized, and the resulting crystalline trioxane containing polyoxymethylene dimethoxide is allowed to stand in an open system in an atmosphere of air or an inert gas, whereby the polyoxymethylene dimethoxide is removed from the trioxane. Thereafter the crystalline trioxane is melted and is used as a component for polymerization or copolymerization.

The atmosphere in which trioxane is crystallized and in which the crystalline trioxane is allowed to stand may be air, but is preferably an inert gas, such as nitrogen or argon to prevent deterioration in quality of trioxane. Preferably, the atmosphere is kept in a dry state in order to prevent the trioxane from absorbing moisture.

The shape of the crystalline trioxane is not critical. The shape of the crystalline trioxane may be lump, plate or particle, but crystalline trioxane in the shape of plate or particle is preferred, because this give more surface area per unit of weight. When it is in a plate shape, the plate is preferably less than 5 cm thick; and when it is in a particle shape, its diameter is preferably less than 5 cm, more preferably less than 2 cm.

It is critical that the crystalline trioxane containing polyoxymethylene dimethoxide be allowed to stand in an open system in an atmosphere of air or an inert gas. It is unnecessary to move the air or an inert gas over the trioxane by pressure. When the crude trioxane is crystallized in a closed vessel and is allowed to stand therein, only a little of the polyoxymethylene dimethoxide contained in the trioxane is removed from the trioxane.

The length of time the crystalline trioxane is allowed to stand in an open system depends on size of the crystal and shape of the crystal, size of opening of the vessel, whether or not the air or the inert gas is moved over the trioxane under pressure, the velocity of the moving gas and the rate of polyoxymethylene dimethoxide removal. Polyoxymethylene dimethoxide is removed within the time required to crystallize the trioxane and to reduce the crystal to particles. In general, the crystalline trioxane is allowed to stand in an open system for more than 5 seconds, preferably more than 15 seconds.

In order to crystallize liquid trioxane, it is necessary to cool it to a temperature below 64° C., the melting point of trioxane. For example, in order to obtain crystalline trioxane in a plate shape, the liquid trioxane is poured into cooled metal vat. Alternatively, liquid trioxane may be continuously poured on cooled conveyer to crystallize it. The crystallized trioxane in a plate shape may be allowed to stand in an open system as it is. Alternatively, the crystallized trioxane may be reduced by means of jaw crusher or rotary cutter, followed by allowing the reduced trioxane to stand in an open system.

In carrying out the above operation industrially, a screw extruder or self-cleaning mixer, the jacket of which is coolable, or flaker may used. In this case, crystallization and reduction of the trioxane are simultaneously effected. The crystallization and the reduction are effected under an open system in air, or they may be effected by passing a pressurized inert gas through the cutter or mixer.

The trioxane so crystallized and reduced contains little polyoxymethylene dimethoxide. Even when the trioxane from which polyoxymethylene dimethoxide is removed is melted, the amount of polyoxymethylene dimethoxide in the trioxane does not return to the original amount. On the other hand, when trioxane is crystallized in a close vessel and remelted, the amount of polyoxymethylene dimethoxide in trioxane is reduced very little.

A little polyoxymethylene dimethoxide is present in the inner portion of the trioxane crystal, whereas much polyoxymethylene dimethoxide is present on the surface of the trioxane crystal. The mechanism by which the polyoxymethylene dimethoxide is removed is not clear. Polyoxymethylene dimethoxide does not enter the inner portion of trioxane crystal, but is collected on the surface of the crystal, when the trioxane has been crystallized. The polyoxymethylene dimethoxide collected on the surface of crystal will be volatilized, when the trioxane is allowed to stand in an open system.

The apparatus for crystallizing trioxane is simple. A little trioxane is lost during crystallization and melting thereof. From the viewpoint of saving energy, a process for crystallizing trioxane and melting it is superior to a process for distilling an aqueous solution of methanol-containing formaldehyde until the concentration of methanol is reduced to less than 0.1%. An aqueous solution of formaldehyde having a methanol content of less than 0.1% by weight is costly as a raw material for industrial use. When the methanol content of the formaldehyde is more than 20% by weight, the trioxane made from it contains relatively much polyoxymethylene dimethoxide. It is difficult to remove polyoxymethylene from trioxane containing much polyoxymethylene dimethoxide. So, the aqueous solution of trioxane used as a raw material profitably contains 0.1-20% by weight of methanol. It is desirable that the concentration of formaldehyde in the aqueous solution be in the range of 20-95% by weight in order to promote the formation of trioxane. An aqueous solution containing more than 95% by weight of formaldehyde is not economical. Preferably the concentration of formaldehyde is with in the range of 40-75% by weight.

As mentioned above, a solution of trioxane in a solvent is recovered from the bottom of a vapor-liquid contacting apparatus. When trioxane is obtained by distilling the solvent from the solution of trioxane, an amine, such as triethanol amine as a stabilizer and/or a phenolic compound as an antioxidant may be added to the solution. Furthermore, an organic trivalent phosphorus compound, such as triphenyl phosphine or tributyl phosphine as a stabilizer may be added to the solution. The use of such a stabilizer prevents the deterioration in quality of trioxane in air.

The trioxane containing a little polyoxymethylene dimethoxide obtained through crystallization and melting is polymerized or copolymerized in the presence of a catalyst, such as boron trifluoride or its complex. In this case, since the trioxane contains little polyoxymethylene dimethoxide which acts as a chain transfer agent, a polymer of trioxane or a copolymer of trioxane and another monomer having high molecular weight can be obtained. If not enough polyoxymetylene dimethoxide is removed from the trioxane, the step of crystallization and melting may be repeated.

Any of the known process for polymerizing or copolymerizing trioxane may be used. Solution polymerization and bulk polymerization are suitable industrially. Bulk polymerization is preferred, since the polymer can be obtained in a high yield.

Trioxane is copolymerized with another comonomer, such as a cyclic ether, such as ethylene oxide and a cyclic formal, such as 1,3-dioxysepbane.

In case of polymerizing or copolymerizing trioxane, both the batch method and continuous method are usable. Preferably, trioxane is industrially polymerized or copolymerized by a continuous method. A Ko-kneader continuous polymerizer and extruder of self-cleaning type having 2 or more screws and combination of two or more polymerizers may be used as continuous polymerizer. A two-stage polymerizer in which the first stage polymerizer is a polymerizer of self-cleaning type and the second stage polymerizer is kneader, kneader-ruder, ribbon blender or pin mixer of batch or continuous type which can agitate the contents and which can transport it from one end to the other end is also usable. In this case, the composition withdrawn from the first stage polymerizer has polymer content of 40–70% and the composition withdrawn from the second stage polymerizer has polymer content of more than 90%.

The present invention is further illustrated by the following Examples. However, this invention is not limited by these examples. The percent and parts in the Examples are based on weight unless otherwise specified.

EXAMPLE 1

Into a reactor equipped with fractionating column was charged an aqueous solution containing 1% by weight of methanol, 55% by weight of formaldehyde and 2% by weight of sulfuric acid. The solution was distilled so that the temperature of the distillate removed from the reactor was within the range of 92°–96° C. The distillate removed from the reactor was introduced into a vapor-liquid contacting apparatus and was vapor-liquid-contacted with benzene, and a solution of trioxane in benzene was recovered from the bottom of the apparatus. The solution was introduced into a benzene-distilling column, and the benzene was distilled therefrom, thereby obtaining liquid crude trioxane from the bottom of the column. The impurities contained in the trioxane were analyzed, and the result is shown in Table 1. The concentration of polyoxymethylene dimethoxide was measured by gas-chromatography. In the following Examples the concentration was measured in the same way. The resulting crude trioxane was cooled and was poured in a cooled vat to rapidly crystallize the trioxane. The crystal formed was a plate 5 mm thick. The crystal plate was reduce to particles of 5 mm×10 mm×10 mm or less. Again, the trioxane crystal was heat melted. The concentration of polyoxymethylene dimethoxide in the melted trioxane was measured. The result is shown in Table 2.

Table 1

| Impurities | (PPm) concentration |
| --- | --- |
| methanol | 0 |
| methylal | 0 |
| methylformate | 0 |
| benzene | less than 5 |
| water | 15 |
| formic acid | 3 |
| formaldehyde | 6 |

Table 1-continued

| Impurities | (PPm) concentration |
| --- | --- |
| polyoxymethylene dimethoxide | |
| $n = 2$ | 2800 |
| $n = 3$ | 500 |
| $n \geq 4$ | less than 10 |

Table 2

| polyoxymethylene dimethoxide | concentration (PPm) |
| --- | --- |
| $n = 2$ | 125 |
| $n = 3$ | less than 1 |
| $n \geq 4$ | 0 |

Into a sigma-type bench kneader having two blades was charged 250 gr. of the resulting trioxane. To the trioxane were added 25 gr. of cyclohexane and 6.3 gr. of ethylene oxide. The mixture was maintained at 65° C. When boron trifluoride ethyl etherate in amount of 0.15 m mol per 1 mol of trioxane was added to the mixture as a polymerization catalyst, the mixture turned white. This means that copolymerization of trioxane and ethylene oxide was effected. After one hour, triphenyl phosphine twice the amount of catalyst was added to the solution to terminate the reaction. The polymer so formed was removed and was dried at a reduced pressure. The yield of the polymer was 95.2%. The intrinsic viscosity of the polymer was measured in p-chlorophenol containing 2% of alpha-pinene to obtain value of 1.53 dl./gr.

For comparison, liquid crude trioxane was copolymerized with ethylene oxide in the above way without crystallizing the trioxane and melting it. The yield of the polymer was 96.5%. The intrinsic viscosity thereof was 0.73 dl./gr.

EXAMPLE 2

The liquid crude trioxane was prepared in the same way as Example 1 except that concentration of methanol in the formaldehyde solution was 3.5% by weight. The impurities in the crude trioxane was analyzed. The result is shown in Table 3.

Table 3

| Impurities | concentration (PPm) |
| --- | --- |
| methanol | 0 |
| methylal | 0 |
| methylformate | 0 |
| benzene | less than 5 |
| water | 15 |
| formic acid | 15 |
| formaldehyde | 30 |
| polyoxymethylene dimethoxide | |
| $n = 2$ | 12000 |
| $n = 3$ | 800 |
| $n = 4$ | 150 |
| $n \geq 5$ | less than 10 |

The liquid crude trioxane was divided into two parts and the parts crystallized by the two following methods. The amount of polyoxymethylene dimethoxide in each of the two resulting batches of trioxane was measured. The result is shown in Table 4.

The two crystallization methods are as follows:

(I) The crude trioxane was continuously cooled and crystallized in a two-screw extruder having jacket in which water is circulated. Nitrogen gas was introduced under pressure into ventilator of the extruder. Particle size of the resulting trioxane crystal was less than 5 mm. The trioxane was melted.

(II) The crude trioxane was placed in a storage tank having jacket in which water heated at 80° C. was circulated. Valves positioned at inlet and exit of the tank were closed. Thereafter introduction of the hot water was discontinued and cooled water of 25° C. was passed through the jacket to crystallize the trioxane. Again, hot water was passed through the jacket to heat the trioxane, thereby melting it.

Table 4

| polyoxymethylene dimethoxide | concentration (PPm) | |
|---|---|---|
| | crystallization method (I) | crystallization method (II) |
| n = 2 | 580 | 11800 |
| n = 3 | 50 | 790 |
| n ≧ 4 | less than 5 | less than 150 |

Each of the batches of trioxane obtained by the two treatment methods was copolymerized as shown in Example 1 by using the components shown in Table 5. In Table 5 the amount of boron trifluoride ethyl etherate is based on 1 mol of trioxane.

Table 5

| | unit | Treatment of crude trioxane | |
|---|---|---|---|
| | | (I) | (II) |
| trioxane | gr. | 250 | 250 |
| ethylene oxide | " | 6.3 | 6.3 |
| cyclohexane | " | 25 | 25 |
| boron trifluoride ethyl ethelate | m mol/mol trioxane | 0.15 | 0.15 |
| temperature | °C. | 65 | 65 |
| yield | % | 95.8 | 96.2 |
| intrinsic viscosity | dl./gr. | 1.38 | 0.40 |

EXAMPLE 3

The crude trioxane was prepared by the method as disclosed in Example 1 except that an aqueous solution comprising 1% by weight of methanol, 55% by weight of formaldehyde and 2% by weight of sulfuric acid is used. The liquid trioxane was crystallized by a flaker. The flaker had rotable metal cylinder and stationary blade. In other words, the liquid trioxane was poured into one end of the cylinder and was cooled at the inner surface of the cylinder, whereby the trioxane crystallized on the surface. The stationary blade scraped the trioxane deposited on the surface, and the trioxane was withdrawn from the other end of the cylinder. The trioxane crystal withdrawn was in a plate shape about 1.5 mm thick and averaged 1 cm square.

The trioxane crystal was placed into a storage tank having a jacket and was heated by passing water of 80° C. through the jacket, thereby melting the trioxane. The trioxane was continuously introduced into a continuous polymerizer and was copolymerized with ethylene oxide. The continuous polymerizer comprises two parts; one is (a) a mixer having a jacket and being composed of a transversely extended case having a pair of shaft, many elliptical plates being installed on each of the two shafts at their center point; and the set of elliptical plates installed on one shaft mesh with the set of elliptical plates installed on the other shaft, and the end of the plates are capable of cleaning the inner surface of the case and the surface of the other set of the plates, and the other is (b) a pin-mixer connected to the mixer.

Into the polymerizer were charged 2 Kg/hr. of trioxane and 50 gr./hr. of ethylene oxide and boron trifluoride ethyl etherate in amount of 0.18 m mol per 1 mol of trioxane. The copolymerization was effected at a polymerization temperature of 80° C. The crude polymer having polymer content of 65% was withdrawn from the mixer. The crude polymer was charged into the pin-mixer. The polymer withdrawn from the pin-mixer had polymer content of 99.5% by weight and intrinsic viscosity of 1.62 dl./gr.

The liquid crude trioxane was copolymerized by the above process without crystallizing it in the flaker. The polymer had polymer content of 99.3% by weight and intrinsic viscosity of 1.08 dl./gr.

EXAMPLE 4

The liquid crude trioxane of Example 1 was employed in this example. The trioxane was poured into a vat cooled at 20° C. to crystallize it in an atmosphere of air. The trioxane crystal was in a plate shape 5 mm thick. The plate was reduced to pieces less than 1 cm square. The concentration of polyoxymethylene dimethoxide in the troixane was measured. The result is shown in Table 6.

Table 6

| polyoxymethylene | dimethoxide |
|---|---|
| n = 2 | 125 |
| n = 3 | less than 10 |
| n ≧ 4 | 0 |

Into a bench kneader having a sigma blade for agitation was charged 250 gr. of the trioxane. To the trioxane was added 50 gr. of cyclohexane, and the mixture was maintained at 65° C. When boron trifluoride ethyl etherate in amount of 0.20 m mol per 1 mol of trioxane was added to the mixture as a polymerization catalyst, the mixture turned white. This means that homopolymerization of trioxane was effected. After one hour twice as much triphenyl phosphine as catalyst was added to the solution to terminate the reaction. The polymer so formed was removed and was dried at a reduced pressure. The yield of the polymer was 98.2%. The intrinsic viscosity of the polymer was 1.68 dl./gr.

For comparison, liquid crude trioxane was polymerized in the above way without crystallizing the trioxane and melting it. The yield of the polymer was 97.8%. The intrinsic viscosity thereof was 1.09.

We claim:

1. A process for polymerizing trioxane made from an aqueous solution of methanol-containing formaldehyde by a conventional method or copolymerizing the trioxane with another monomer, comprising
    cooling the trioxane to crystallize,
    allowing the trioxane in a crystalline state to stand in an open system in an atmosphere of air or an inert gas to remove polyoxymethylene dimethoxide from the trioxane,
    melting the trioxane, and
    polymerizing the trioxane or copolymerizing the trixane with said another monomer.

2. The process as defined in claim 1 wherein the liquid trioxane is crystallized in an open system where air or an inert gas is moved under pressure, thereby forming the trioxane crystal into a shape of plate or particle.

3. The process as defined in claim 2 wherein the trioxane crystal is formed into a plate shape.

4. The process as defined in claim 3 wherein thickness of the plate is less than 5 cm.

5. The process as defined in claim 2 wherein the trioxane crystal is formed into a shape of particle.

6. The process as defined in claim 5 wherein the size of the particle is less than 5 cm.

7. The process as defined in claim 5 wherein the size of the particle is less than 2 cm.

8. The process as defined in claim 1 wherein the aqueous solution of methanol-containing formaldehyde contains from 20% to 95% by weight of formaldehyde and from 0.1% to 20% by weight of methanol.

9. The process as defined in claim 1 wherein the aqueous solution of methanol-containing formaldehyde contains from 40% to 75% by weight of formaldehyde and from 0.2% to 10% by weight of methanol.

10. The process as defined in claim 9 wherein the aqueous solution is heat-distilled in the presence of an acid catalyst, and the resulting distillate being introduced into a vapor-liquid contacting apparatus to contact the distillate with a solvent which is insoluble or only slightly soluble in water, thereby recovering solution of trioxane in the solvent from the bottom of the apparatus; and the solvent is removed from the solution through distillation to obtain liquid trioxane.

* * * * *